United States Patent [19]

Auman

[11] Patent Number: 5,177,176
[45] Date of Patent: Jan. 5, 1993

[54] SOLUBLE PSEUDO ROD-LIKE POLYIMIDES HAVING LOW COEFFICIENT OF THERMAL EXPANSION

[75] Inventor: Brian C. Auman, Newark, Del.

[73] Assignee: E. I. Du Pont de Nemours and Company, Wilmington, Del.

[21] Appl. No.: 784,354

[22] Filed: Oct. 29, 1991

[51] Int. Cl.$^5$ .................... C08G 63/00; C08G 73/10; C08G 69/26

[52] U.S. Cl. .................... 528/188; 528/125; 528/128; 528/172; 528/173; 528/174; 528/176; 528/183; 528/185; 528/190; 528/191; 528/220; 528/229; 528/350; 528/353

[58] Field of Search ........ 528/125, 128, 172, 173-174, 528/176, 183, 185, 188, 190, 191, 220, 229, 350, 353; 549/388

[56] References Cited

U.S. PATENT DOCUMENTS

| | | | |
|---|---|---|---|
| 5,051,520 | 9/1991 | Trofimenko | 549/388 |
| 5,097,000 | 3/1992 | Trofimenko | 528/183 |
| 5,101,004 | 3/1992 | Trofimenko | 528/176 |

OTHER PUBLICATIONS

Frank W. Harris & Steve L.-C. Hsu, Synthesis and Characterization of Polyimides Based on 3,6-Diphenylpyromellitic Dianhydride, 1989, pp. 3-16.

Frank W. Harris & Yoshimitsu Sakaguchi, Soluble Aromatic Polyimides Derived from New Phenylated Diamines, 1989, pp. 187-191.

*Primary Examiner*—John Kight, III
*Assistant Examiner*—P. Hampton-Hightower

[57] ABSTRACT

Polyimide compositions, films, and electronic devices using polyimides, based on 9-aryl-9(perfluoroalkyl)-xanthene-2,3,6,7-dianhydride and one or more diamines from a selected group, which offers to the polyimides a combination of desirable properties including solubility, pseudo rod-like structure, low linear coefficient of thermal expansion, high glass transition temperature, low dielectric constant, and high modulus.

8 Claims, No Drawings

SOLUBLE PSEUDO ROD-LIKE POLYIMIDES HAVING LOW COEFFICIENT OF THERMAL EXPANSION

FIELD OF THE INVENTION

This invention relates to polyimide compositions, films, and electronic devices using polyimides, based on 9-aryl-9(perfluoroalkyl)xanthene-2,3,6,7-dianhydride and one or more diamines selected such that said polyimides attain a pseudo rod-like structure, solubility in standard organic solvents for polyimides, and low coefficient of thermal expansion.

BACKGROUND OF THE INVENTION

Polyimides constitute a class of valuable polymers being characterized by thermal stability, inert character, usual insolubility in even strong solvents, and high Tg, among others. Their precursors are usually polyamic acids, which may take the final imidized form either by thermal or by chemical treatment.

Polyimides have always found a large number of applications requiring at least some of the aforementioned characteristics in numerous industries, and recently their applications have started increasing dramatically in electronic devices, especially as dielectrics. With continuously escalating sophistication in such devices, the demands on the properties and the property control are becoming rather vexatious.

Especially for the electronics industry, improvements of polyimides are needed in forming tough, pin-hole free coatings, having low linear coefficient of thermal expansion, among others. It is not usually possible to maximize all properties, since many of them are antagonistic. Thus, only a compromised solution is usually achieved by at least partially sacrificing one or more of these properties in order to maximize a desired one.

As aforementioned, precursors of polyimides are usually polyamic acids. A typical way of creating a polyimide film or coating is to apply first the polyamic acid precursor, and then heat it to a high enough temperature, usually between 300° C. and 400° C., so that it converts to the polyimide form. This may be undesirable many times for a plurality of reasons. One reason is that the polyamic acid precursor may be such that it does not allow formation of high molecular weight compositions, i.e., when the reactivity of one or more of the monomers (e.g., the diamine) is low. Thus, when the polyamic acid precursor is applied, the coating is very brittle, and it develops unacceptable cracks and other defects. A second reason is that the reaction to form the poly(amic acid) is an equilibrium reaction. That is, although the reactivity of the monomers may be good and a high molecular weight poly(amic acid) can be formed, a small amount of depolymerization (the reverse reaction) can occur which becomes more favored with increasing temperature. Thus, during thermal curing of the poly(amic acid) to polyimide some depolymerization may occur which results in a decrease in molecular weight. If this decrease is significant enough, the film may become brittle to the point of cracking prematurely before total conversion is reached, thus resulting in poor film quality. Another problem associated with this reverse reaction is the susceptibility of the poly(amic amic) chemistry to hydrolysis, so that water present in the poly(amic acid) solution can lead to molecular weight degradation with time and the problems associated with it, e.g., brittleness, cracking. The imide linkage, on the other hand, once formed is generally not susceptible to such reverse reaction. Poly(amic acid)s can also slowly imidize under mild conditions such that shelf life may be limited and refrigeration required. A third reason is that for some applications the high curing temperatures often necessary to convert the poly(amic acid) to polyimide may be detrimental to the substrate or component that the polyimide is used with. A fourth reason is that the liberation of water during the conversion of the polyamic acid to the polyimide may be undesirable, especially in the case of thick coatings. Water liberation in some occasions may cause bubbling and blistering of the coating with catastrophic results to the device comprising the coating.

Therefore, a need has been created for polyimides which are soluble in commonly used solvents (for polyimides), and which do not have to pass through the polyamic acid phase in the stage of producing a coating or other structures, such as fibers, for example. Often, the mechanical properties of such a coating made directly from a polyimide are improved over those of the same composition prepared via a poly(amic acid) precursor. Of course, in addition to being soluble, these polyimides should impart to the coating at least one additional property required by the application. Examples of such desired properties are high modulus, low linear coefficient of thermal expansion, low dielectric constant, low moisture absorption and the like. Typically, it is preferable that the polyimide be soluble at room temperature for ease of handling and processing. However, high temperature processing may not pose a significant problem in some applications, e.g. spinning of fibers.

An especially important property for electronics, and other applications as well, is low thermal expansion coefficient. This is because in electronic components, differences in the expansion coefficients of the components that make up the electronic device can generate stresses in the device which may lead to premature device failure. As electronic components become ever smaller, control of stress becomes an ever greater concern, such that the thermal expansions of the various components of a device should be matched as closely as possible. Since the stress can generally be related to the product of the difference in thermal expansion of the components and the moduli of those components, control of these factors is important in minimizing stress. Polymers generally have much higher thermal expansion coefficents than other components which make up electronics devices, e.g. silicon, silicon dioxide, copper, aluminum, etc., so that often the large mismatch between polymer and the other components of the device can lead to high stresses within the device. Attempts to reduce the stresses between polymers and the other materials have generally focused on reducing the thermal expansion coefficient mismatch between materials, although it is also possible to reduce stress by reducing modulus. In polyimides, low thermal expansion coefficient has generally been achieved by the use of a very stiff, rod like backbone. A good example of this is the polyimide based on 3,3'3,4-biphenyltetracarboxylic dianhydride (BPDA) and p-phenylene diamine (PPD). This polyimide, depending on processing conditions, can have a linear thermal expansion coefficient in the range of 3-4 ppm which closely approximates that of silicon such that the stress between silicon and polyimide can be very low. The drawback of BPDA/PPD and similar polyimides is that they are usually very insoluble in typical solvents such that they generally must be processed from the poly(amic acid) precusor. On the other hand, soluble polyimides are known in the art, but generally to achieve solubility, flexibility is typically incorporated into the backbone structure such that an undesirably high linear thermal expansion is typically obtained and the glass transition temperature is often reduced. It is very desirable therefore to prepare soluble, rod-like polyimides which achieve the advantages of solubility while providing low thermal expansion coefficient and high glass transition temperature. The present invention seeks to provide such a combination. It should be noted here that, to some extent, the linear thermal expansion coefficient that is obtained for a polyimide film depends on processing conditions, such as solution concentration, spin coating speed, viscosity, cure profile and film thickness. This can cause the CTE of a particular polyimide structure to vary over a range; but in general, the rigidity of the polymer chain will determine in what range the CTE will fall.

Polyimides based on phenylated pyromellitic dianhydride and/or phenylated diamines, which polyimides have a rod-like structure, have been prepared by Harris and Hsu, "Synthesis and Characterization of Polyimides Based on 3,6-Diphenylpyromellitic Dianhydride", High Performance Polymers, Vol. 1, No. 1, pp. 3–16, 1989; and by Harris and Sakaguchi, "Soluble Aromatic Polyimides Derived From New Phenylated Diamines", ACS Polymeric Materials Science and Engineering, Vol. 60, pp. 187–191, 1989. Their technique is based on using straight (unbent) dianhydride/diamine structures having bulky pendant groups.

It has now been found that polyimides based on 9-aryl-9(perfluoroalkyl)xanthene-2,3,6,7-dianhydride and a certain class of diamines provide pseudo rod-like polyimides which are soluble and suitable for compositions which may be used to form dielectric films and coatings for electronic circuits characterized by high thermal stability, high glass transition temperature, high modulus, low linear coefficient of thermal expansion, and relatively low dielectric constant. Actually, these polyimides are also suitable for completely different applications, such as for example highly oriented fibers, which are characterized by high modulus and strength.

Since 9-aryl-9(perfluoroalkyl)xanthene-2,3,6,7-dianhydride has a slight bend in its molecule, about 10 degrees, due to the difference in C—C and C—O bond lengths of the central ring unit, it tends to help the solubility without greatly deterring from the rod-like structure. Additionally, the rings do not lie in a plane, but are puckered slightly out of plane by about 22° with the phenyl group of the bridge unit located toward the inside of the pucker. For these reasons, the term "pseudo rod-like" was adopted. Further, in addition to the asymmetry caused by the different bridging groups C—O—C and C—C(CF3)(Ph)—C, further asymmetry is caused along the polymer chain by the random orientation of the phenyl and CF3 groups along the backbone. Generally, they are believed to be arranged atactically (randomly) on either side of the polymer chain. This combination of unusual attributes allows optimized solubility/rod-like structure balance. Even groups which decrease solubility may be introduced up to a certain limit without insolubilizing the polyimide. Other groups, like for example perfluorinated groups, are important for lowering the dielectric constant and decreasing moisture absorption, and can be introduced up to a certain limit without detracting from the desirable properties. In addition, the amount of pendant bulky groups needed to solubilize the polyimide is reduced. It is worth noting that conventional monomers, if they are bent, the angle of the bend is rather high, and therefore they do not share the advantages that 9-aryl-9(perfluoroalkyl)-xanthene-2,3,6,7-dianhydride provides. In addition, the presence of the perfluoroalkyl group of 9-aryl-9(perfluoroalkyl)xanthene-2,3,6,7-dianhydride provides further advantages in that it serves to reduce dielectric constant and potentially moisture absorption in the polyimide as is typically encountered in the art for fluorinated polymers.

SUMMARY OF THE INVENTION

This invention relates to polyimide compositions, films, and electronic devices using polyimides, based on 9-aryl-9(perfluoroalkyl)xanthene-2,3,6,7-dianhydride and one or more diamines selected such that said polyimides attain a pseudo rod-like structure, solubility in solvents commonly used for polyimides, and low linear coefficient of thermal expansion. Optionally one or more other dianhydrides, in addition to 9-aryl-9(perfluoroalkyl)-xanthene-2,3,6,7-dianhydride and one or more diamines in addition to the selected diamines may be used. More particularly, it pertains to a polyimide comprising the structure:

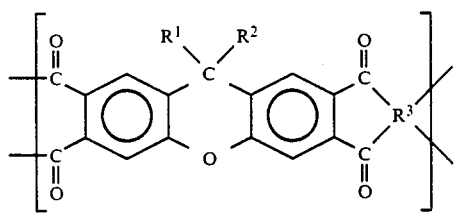

wherein
R1 is aryl
R2 is —CnF2n+1,
N is an integer 1–3
R3 is selected from the group consisting of

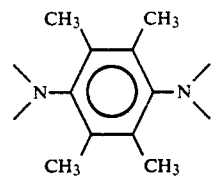

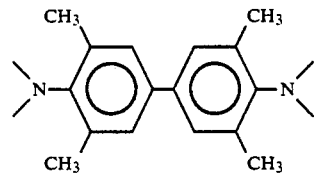

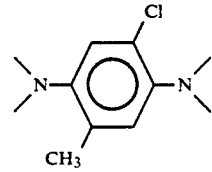

-continued

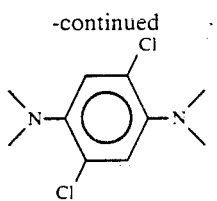

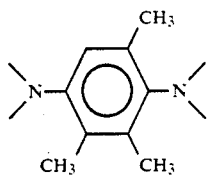

and

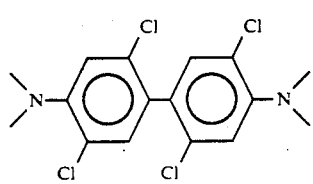

with the requirement that the polyimide is soluble at a level of at least 1% by weight in at least one organic solvent selected from the group consisting of dimethylsulfoxide, diethylsulfoxide, N,N-dimethylformamide, N,N-diethylformamide, N,N-dimethylacetamide, N,N-diethylacetamide, N-methyl-2-pyrrolidone, N-cyclohexyl-2-pyrrolidone, 1,3-dimethyl-2-imidozolidione, N-vinyl-2-pyrrolidone, phenol, o-, m-, p-cresol, xylenol, halogenated phenol, catechol, hexamethylphosphoramide, γ-butyrolactone, chloroform, tetrachloroethane, halogenated hydrocarbon and mixtures thereof; and has a coefficient of thermal expansion of less than 25 ppm.

Preferably, R3 is selected from the group consisting of

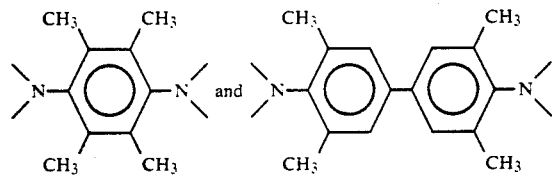

Also, preferably, R1 is phenyl and R2 is -CF3.

This invention also relates to a film comprising a polyimide as defined above.

In addition, it relates to an electronic device comprising:

an electronic component selected from the group consisting of conductor, semiconductor, and insulator; and a dielectric or protective film deposited thereon, the dielectric or protective film comprising a polyimide of the type defined above.

DETAILED DESCRIPTION OF THE INVENTION

This invention is directed to polyimide compositions, films, and electronic devices using polyimides, based on 9-aryl-9(perfluoroalkyl)xanthene-2,3,6,7-dianhydride and one or more diamines selected such that said polyimides attain a pseudo rod-like structure, solubility in solvents commonly used for polyimides, and low coefficient of thermal expansion. Optionally, the polyimide may contained one or more dianhydrides in addition to 9-aryl-9(perfluoroalkyl)xanthene-2,3,6,7-dianhydride, as well as, one or more diamines in addition to the selected diamines.

As aforementioned, rod-like soluble polyimides are needed in forming tough, pin-hole free coatings, having one or more desirable properties, such as low dielectric constant, low linear coefficient of thermal expansion, high thermal stability, high glass transition temperature, and high modulus, among others. From these properties, low linear coefficient of thermal expansion is of particular importance for many applications involving electronic devices.

The linear coefficient of thermal expansion is considered to be low if it has a value of 25 ppm, or lower. This is because the components involved, such as for example conductors, semiconductors, and inorganic dielectrics or insulators have linear coefficients of thermal expansion (CTE) in the range of 0-25 ppm. For example, the CTE of silicon dioxide is 0.4 ppm, the CTE of silicon is 3-4 ppm, the CTE of aluminum oxide is 6 ppm, the CTE of copper is 17 ppm, and the CTE's of gold, aluminum and silver are in the range of 10-25 ppm. Although it is preferable to have a perfect match of the CTE's of the substrate and the polyimide coating, this is impractical in most cases, since a variety of materials are involved within the same electronic device, such as for example circuitry on even a single silicon wafer. Depending on the particular case, CTE's closer to a narrower sub-range within the broader 0-25 ppm range may be desired. In general CTE's in the range 0-10 ppm are preferable, and CTE's in the range 0-5 ppm are even more preferable as they are close to the CTE's of silicon dioxide and silicon, both being the most common materials found in the semiconductor devices.

The dielectric constant is considered to be low if it is lower than 3.0 under dry conditions, and preferably lower than 2.8 and most preferably lower than 2.5. A dielectric constant of over 3.0 is less desirable, or it may even become unacceptable for a number of applications, especially as electronic circuitry becomes smaller and circuit patterns become finer.

Electronic devices, such as for example silicon wafers which may contain electronic components, such as conductors, semiconductors, insulators, and combinations thereof, may be coated with the compositions of the present invention. Other examples include printed circuits, hybrid circuits, and the like. The compositions of the present invention in the form of dielectric or protective films are characterized by low linear coefficient of thermal expansion, low dielectric constant, high modulus, high glass transition temperature, and high thermal stability.

The polyimides of the present invention may also find other applications, such as for example in fibers, since the pseudo rod-like structure of these polyimides helps in achieving high orientation during the spinning process, a process very well known to the manufacturing of fibers. A polyimide fiber made by spinning the polyamic acid and then imidizing does not readily attain such orientation or the high modulus and strength resulting therefrom.

As shown in the examples, even with the assistance of 9-aryl-9(perfluoroalkyl)xanthene-2,3,6,7-dianhydride, which has a slight bend in its molecule, about 10 degrees, and other attributes which tend to help solubility without greatly deterring from the rod-like structure, only a very small group of structures of R3 is effective in providing solubility while maintaining a pseudo rod-like structure. This combination of unusual attributes allows optimized solubility/rod-like structure balance, so that even groups which decrease solubility may be introduced up to a certain limit without insolubilizing the polyimide. Other groups, like for example perfluorinated groups, are important for lowering the dielectric constant and decreasing moisture absorption and they can be introduced up to a certain limit without detracting from the desirable properties of the polyimide. In addition, the amount of pendant bulky groups needed to solubilize the polyimide is reduced. It is worth noting that conventional monomers, if they are bent, the angle of the bent is rather high, and therefore they do not share the advantages that 9-aryl-9(perfluoroalkyl)xanthene-2,3,6,7-dianhydride provides. In addition, the presence of the perfluoroalkyl group of 9-aryl-9(perfluoroalkyl)-xanthene-2,3,6,7-dianhydride provides further advantages in that it serves to reduce dielectric constant and potentially moisture absorption in the polyimide as is typically encountered in the art for fluorinated polymers.

The most preferable amines, which are the source of R3, have a linear (unbent) configuration with an adequate amount of pendant groups to provide solubility when chemically combined with 9-aryl-9(perfluoroalkyl)xanthene-2,3,6,7-dianhydride. Of these, the diamines containing methyl groups have been found to be more preferable from a reactivity standpoint versus those containing chloro groups, particularly when the groups are in positions ortho to the amine functionality. Diamines with chloro groups in the ortho position relative to amine, due to their lower reactivity, tend to give lower molecular weight polyimides. Chlorine containing materials are also somewhat less prefered in electronics applications, but may be well suited in other applications (e.g. fibers). Methyl groups while generally known to have somewhat lower thermo-oxidative stability versus all aromatic systems, may have advantages in terms of ability to be crosslinked during or after processing, thus insolubilizing the final polyimide form. In any case, as shown in the examples, the thermal stability in terms of onset of weight loss in TGA was found to be fairly high.

It should also be noted that when using diamines with less pendant groups or pendant groups of lower bulk, it may be necessary to reduce the concentration of solids during the imidization reaction, so as to increase the solubility of the resulting polyimide.

It should be understood that monomers other than the ones shown in the structure of the aforementioned monomers (diamines, dianhydrides, and mixtures thereof) may also be used in small amounts in the structure of the polyimides of the present invention. Such monomers may have, for example, the purpose of promoting a desired property. However, they should be used in small enough amounts, which amounts are ineffective in moving the character of the polyimides outside the scope of the claims of this invention.

Examples of other rod-like diamines that can be used in combination with the selected diamines of the present invention include but are not limited to: p-phenylene diamine, 4,4'-diaminobiphenyl, 4,4'-diamino-2,2'-bis(trifluoromethyl)biphenyl, 2-trifluoromethyl-1,4-phenylene diamine (2,5-diaminobenzotrifluoride), 4,4'-diamino-2,2'-dimethylbiphenyl, 4,4'-diamino-2,2'-dichlorobiphenyl, 4,4'-diamino-3,3'-dimethylbiphenyl, 2,5-dimethyl-1,4-phenylene diamine, 4,4'-diamino-2,2'bis(trifluoromethoxy)biphenyl, 2-methyl-1,4-phenylene diamine, 2-chloro-1,4-phenylene diamine, 4,4'-diamino-3,3'-dimethoxybiphenyl, 4,4''-diaminoterphenyl, 4,4'''-diaminoquarterphenyl, 1,4-diaminobenzanilide, 2,5-diaminopyridine, 2,7-diaminofluorene, o-tolidine sulfone, 9,10-bis(4-aminophenyl) anthracene, and 1,5-diaminonaphthalene. The use of such diamines versus non rod-like diamines is preferable because, in general, they would tend to maintain the low linear thermal expansion coefficient of the resulting polyimide. Their amounts should be limited, to such an extent that they do not adversely affect the solubility or other desirable properties of the resulting polyimide.

Comparative examples I, VI, and VII are examples of homopolymers of some of these other rod-like diamines with 9-phenyl-9-trifluoromethylxanthene dianhydride. In these cases, the homopolyimides are not readily soluble at room temperature in the typical solvents for polyimides. For comparative example I, however, solubility was obtained at elevated temperature, which indicates that it should be possible to use substantial amounts of the diamine in this example (2,2'-bis[trifluromethyl] benzidine) in combination with the diamines of the present invention and obtain a soluble polyimide. For the other two comparative examples, VI and VII, solubility at even high temperature was not achieved under the chosen conditions indicating that somewhat smaller amounts are likely permissible of such diamines in combination with the diamines of the present invention in order to obtain a soluble polyimide. It should also be noted as mentioned previously that reducing the concentration of solids when using such diamines may provide increased solubility of the resulting polyimide; however, the concentration should not be too low especially during the polymerization or it may have an adverse effect on the molecular weight of the resulting polyimide. A very low concentration may also be detrimental during film formation due to the high shrinkage associated with the large loss of solvent during processing.

Other rod-like diamines which contain similar or even bulkier groups than the diamines cited in the present invention would be expected to produce soluble rod-like polyimides with 9-aryl-9(perfluoroalkyl)xanthene-2,3,6,7-dianhydride. Examples of such diamines include but are not limited to 4,4'-diaminooctamethylbiphenyl, 4,4'-diamino-2,2',6,6'-tetramethylbiphenyl, and the phenylated terphenyl diamines disclosed by Harris et al as noted above which include: 2',3',5',6'-tetraphenyl-4,4''-diaminoterphenyl, 2',3',6'-triphenyl-4,4''-diaminoterphenyl, and 3,3'',5,5''-tetraphenyl-4,4''-diaminoterphenyl. However, the large amount of bulky groups contained in some of these diamines is usually not necessary for solubility as the polyimides of the present invention exhibit solubility without such large amounts of bulky groups and the effect of such large amounts of bulky groups on properties like thermal expansion coefficient is largely unknown. In any event, in certain occasions, it may be beneficial to use such diamines in combination with 9-aryl-9(perfluoroalkyl)xanthene-2,3,6,7-dianhydride or the compositions of the present invention. Also rod-like diamines with a high degree of bulk may prove beneficial in obtaining soluble polyimides from less soluble pseudo rod-like dianhydrides like 9,9-bis(trifluoromethyl)xanthene-2,3,6,7-dianhydride, for example.

Nonrod-like diamines may also be used in combination with the selected diamines of the present invention. It should be kept in mind, however, that in general, the amount of such diamines should be kept small in order to avoid an undesirably high impact on the linear thermal expansion coefficient of the resulting polyimide. Use of such diamines within the scope of the present invention tends to enhance the solubility of the resulting polyimide. Examples of such diamines include but are not limited to 4,4-diaminodiphenylether (4,4'-oxydianiline), m-phenylene diamine, 2,2-bis(4-aminophenyl)hexafluoropropane, 4,4'-methylenedianiline, 3,4'-diaminodiphenylether, 1,4-bis(4-aminophenoxy)benzene, and the like. Comparative examples II-V give examples of such diamines paired with 9-phenyl-9-trifluoromethyl)xanthene-2,3,6,7-dianhydride. The substantial increase in CTE with the use of these diamines is noted. Use of aliphatic diamines like hexamethylene diamine is also possible although less preferable due to the lower thermal stability and the lowering of glass transition temperature, in addition to the higher thermal expansion.

Other dianhydrides may also be used in combination with 9-aryl-9(perfluoroalkyl)xanthene-2,3,6,7-dianhydride in the practice of the present invention. Dianhydrides like pyromellitic dianhydride, 1,4,5,8-naphthalene tetracarboxylic dianhydride, 2,3,6,7-naphthalene tetracarboxylic dianhydride, 1,2,5,6-naphthalene tetracarboxylic dianhydride, 3,3',4,4'-biphenyltetracarboxylic dianhydride, and 9,9-bis(trifluoromethyl)xanthene-2,3,6,7-dianhydride are especially useful because of their stiff, rod-like or pseudo rod-like nature which would tend to maintain the low thermal expansion coefficient of the resulting polyimide. Other nonrod-like dianhydrides like 3,3',4,4'-benzophenone tetracarboxylic dianhydride, 2,2-bis(3,4-dicarboxyphenyl)hexafluoropropane dianhydride, oxydiphthalic anhydride, 3,3',4,4'-diphenylsulfone tetracarboxylic dianhydride, and the like may also be used. Such dianhydrides typically enhance the solubility of the polyimides of the present invention but should typically be used in small amounts so as not to adversely impact the thermal expansion or other desirable properties of the resulting polyimide. In fact, when used at appropriate levels, the use of such non rod-like dianhydrides as well as the use of non rod-like diamines could be used to taylor the thermal expansion coefficient of a very stiff, low CTE backbone to that of a somewhat higher CTE substrate like copper (CTE=17).

It should also be noted that fluorinated monomers may be especially preferable for use in the polyimides of the present invention because of this ability to reduce the dielectric constant and moisture absorption of polyimides. Examples of such monomers include 4,4'-diamino-2,2'-bis(trifluoromethyl)biphenyl, 2-trifluoromethyl-1,4-phenylene diamine, 9,9-bis(trifluoromethyl)xanthene-2,3,6,7-dianhydride, 2,2bis(4-aminophenyl)- hexafluoropropane, 5-trifluoromethyl-1,3-phenylene diamine, 2,2-bis(3,4dicarboxyphenyl)hexafluoropropane dianhydride. The first three in the above list, being rod-like would help to maintain a low CTE, while the others, being non rod-like would be expected to increase CTE to some extent as noted above.

The use of other dianhydrides in the polyimides of the present invention is possible as mentioned above without appreciably altering the desired properties. An example of such a comonomer is the use of BPDA. If BPDA is used even in an amount in the region of 40 mol % of total dianhydride, the polyimide remains soluble. However, if used in an amount of 100 mol %, the polyimide becomes insoluble as evidenced in the cases of Examples 6, 7 and Comparative Example X.

It is desirable sometimes to have the polyimide in an insoluble state during its final use. To attain such property, crosslinkable end-groups may be attached to the molecules of the soluble polyimide. Such end-groups are well known to the art. Examples are reactive groups such as maleimide, nadimide, acetylenic, styrenic, epoxy, benzocyclobutane, biphenylene, propargyl, paracyclophane, cyano, and the like. It is important that the end group is selected in a manner that it does not polymerize during the process of imidization in the preparation of the polyimide, but that it does polymerize during the processing to the final polyimide film.

Examples of preferred solvents, which may be used in the practice of the present invention are polar organic solvents, such as sulfoxide type solvents including dimethylsulfoxide, diethylsulfoxide, and the like, formamide type solvents including N,N-dimethylformamide, N,N-diethylformamide, and the like, acetamide type solvents including N,N-dimethylacetamide, N,N-diethylacetamide, and the like, pyrrolidone type solvents including N-methyl-2-pyrrolidone, N-cyclohexyl2-pyrrolidone, 1,3-dimethyl-2-imidozolidione, N-vinyl-2-pyrrolidone, and the like, phenolic solvents including phenol, o-, m-, p-cresol, xylenol, halogenated phenol, catechol, and the like, hexamethylphosphoramide, and a number of lactones including γ-butyrolactones. Chlorinated hydrocarbons, such as for example chloroform and tetrachloroethane are also very useful for processing purposes of the present invention. These solvents may be used alone or as a mixture. Partial use of aromatic hydrocarbons such as xylene, toluene, and the like, is also possible, and sometimes desirable, when for example removal of water as an azeotrope is needed.

Explanations and theories given in the discussion above are speculative and should not be construed as limiting the scope of the claims of this invention.

A person of ordinary skill in the art can easily custom-modify the compositions, processes, and articles of the present invention, depending on a desired application, based on the teachings presented above.

GLOSSARY

BPDA: 3,3',4,4'-biphenyltetracarboxylic dianhydride
CHP: N-cyclohexyl-2-pyrrolidone
CTE: Linear Coefficient of Thermal Expansion
DMAC: Dimethylacetamide
DMSO: Dimethylsulfoxide
DSC: Differential Scanning Calorimetry
GPa: Gigapascal
GPC: Gel Permeation Chromatography
mmole: Millimole
Mn: Number average molecular weight
MPa: Megapascal
Mw: Weight average molecular weight
NMP: N-methyl-2-pyrrolidone
ODA: 4,4'-Diaminodiphenyl ether
ppm: Parts per million
R.H. Relative Humidity
Tg: Glass transition temperature
TGA: Thermogravimetric analysis
THF: Tetrahydrofuran TMA: Thermomechanical analysis All parts and percentages are given by weight unless otherwise stated.

EXAMPLE 1

Synthesis of Polyimide based on 9-Phenyl-9-trifluoromethylxanthene-2,3,6,7-dianhydride and Diaminodurene Into a 100 ml reaction kettle fitted with a nitrogen inlet, mechanical stirrer, and a Dean-Stark trap with condenser were charged 5.9162 g (12.687 mmol) of 9-phenyl-9-trifluoromethylxanthene-2,3,6,7-dianhydride and 2.0838 g (12.687 mmol) of diaminodurene. Shortly thereafter, 44.8 ml of NMP and 11.2 ml of CHP were added and stirring was begun. The temperature was maintained at room temperature overnight (ca. 20 hrs) under nitrogen, and then the following day, the reaction mixture was raised to a temperature of 180°-190° C. and maintained overnight (~24 hrs.) to imidize the polymer. At high temperature a viscous, homogeneous solution resulted, which became gel-like when cooled to room temperature. Heating redissolved the polymer. The polymer was diluted to about 8% solids with NMP and then isolated from the reaction solution by precipitation into methanol followed by drying under vacuum with a nitrogen bleed. GPC (DMAC@135° C., polystyrene standards) of the polyimide showed an Mn=84100 and an Mw=228000, Mw/Mn=2.71. The polymer was found to be soluble at room temperature in chloroform and tetrachloroethane. Further purification of the polymer could be performed by dissolution in chloroform or tetrachloroethane followed by precipitation into methanol.

EXAMPLE 2

Coating of silicon wafer with the polyimide of Example 1

Six (6) grams of the dry polymer of Example 1 was dissolved in 94 ml of tetrachloroethane and the solution was slowly pressure filtered through a 5 micrometer filter and then spin coated onto 5" silicon wafers. After spin coating, the wafers were immediately placed in a oven at 135° C. for 30 min., then placed into another oven and heated to 200° C. for 30 min and 350° C. for 1 hr. The resulting polyimide films were coherent and adhered to the wafer.

EXAMPLE 3

Evaluation of the dielectric film of Example 2

In order to determine the properties of the dielectric film made in Example 2, the oxide layer of the silicon wafer was etched in aqueous HF. It yielded a free standing polyimide film which was pale yellow in color and creasable. The thickness of the film was 10.0 micrometers and gave the following mechanical properties when tested on an Instron Model 4501 per ASTM D 882 -83 (Method A): Tensile Strength=230 MPa, Tensile Elongation at Break=8%, and Young's Modulus=4.9 GPa. The linear coefficient of thermal expansion (CTE) was found to be 3 ppm from 0°-200° C. when measured by TMA at 10° C./min. TGA (15° C./min, 50°-600° C., in air) revealed the onset of appreciable weight loss to be about 398° C. under these conditions. The dielectric constant of the dried film at 0% R.H. and 1 MHz was found to be 2.7.

EXAMPLE 4

Synthesis, Use, and Evaluation of Polyimide based on 9-Phenyl-9-trifluoromethylxanthene-2,3,6,7-dianhydride and 3,3',5,5'-Tetramethylbenzidine (3,3',5,5'-tetramethyl-4,4'-diaminobiohenyl)

Similar to the procedure given in Example 1, a polymer was prepared from 3.3726 g (7.2324 mmol) 9-phenyl-9-trifluoromethylxanthene-2,3,6,7-dianhydride and 1.7383 g (7.2324 mmol) 3,3',5,5'-tetramethylbenzidine in 16 ml NMP and 4 ml CHP. After dissolution, the reaction was allowed to proceed overnight at room temperature under nitrogen. A very viscous poly(amic acid) solution resulted which by GPC (DMAc/LiBr/H3PO4/THF solvent, polystyrene standards) had an Mn=110000 and an Mw=213000, Mw/Mn=1.94. This solution was diluted with an additional 25 ml of NMP/CHP (4/1V/V), and then was heated to 180°-190° C. to imidize the polymer. After about 2 hrs at 180°-190° C., the reaction mixture became turbid but remained viscous. After an additional several hours (about 8 hrs total) an additional 25 ml of NMP/CHP was added while hot and the reaction was allowed to proceed overnight. The following day the heterogeneous reaction mixture was cooled to room temperature and precipitated into methanol. After filtration and drying, the polyimide was dissolved in tetrachloroethane (TCE) (~10% solids W/V) and filtered through a 5 micrometer filter for spin coating onto 5"silicon wafers. The films prepared as in Example 2, had a thickness of 6.5 micrometers, and gave the following mechanical properties when tested as in Example 3: Tensile Strength=177 MPa, Tensile Elongation at Break=6%, and Young's Modulus=4.2 GPa. The linear coefficient of thermal expansion (CTE) was found to be 7 ppm from 0°-200° C. when measured by TMA at 5° C./min. TGA (15° C./min, 50°-600° C., in air) revealed the onset of appreciable weight loss to be about 415° C. under these conditions.

EXAMPLE 5

Synthesis, Use and Evaluation of Polyimide based on 9-Phenyl-9-trifluoromethylxanthene-2,3,6,7-dianhydride and 2-Chloro-5-methyl-1,4-phenylene diamine Into a 100 ml reaction kettle fitted with a nitrogen inlet/outlet, mechanical stirrer, and a Dean-Stark trap with condenser were charged 5.9886 g (12.842 mmol) of 9-phenyl-9-trifluoromethylxanthene-2,3,6,7dianhydride and 2.0114 g (12.842 mmol) of 2-chloro-5-methyl-1,4-phenylene diamine. Shortly thereafter, 33.75 ml of NMP and 11.25 ml of CHP (3/1, 15% solids) were added and stirring was begun. The temperature was maintained at room temperature overnight under nitrogen. GPC (DMAc/LiBr/H3PO4/THF solvent, polystyrene standards) Of the poly(amic acid) solution revealed an Mn=39700 and an Mw=82700, Mw/Mn=2.08. The following day, the reaction mixture was diluted with 10.25 ml of NMP and 3.45 ml of CHP (3/1, 12% solids), raised to a temperature of 180°-190° C. and maintained overnight to imidize the polymer. At high temperature a moderately viscous, homogeneous, orange-amber solution resulted, which remained homogeneous when cooled to room temperature. GPC (DMAC@135° C., polystyrene standards) of the polyimide showed an Mn=24600 and an Mw=70800, Mw/Mn=2.88. The polymer was isolated from the reaction solution by precipitation into methanol followed by drying under vacuum with a nitrogen bleed. The isolated polymer was found to be difficult to redissolve into NMP at room temperature, but was soluble in tetrachloroethane and chloroform at room temperature. A 20% (W/V) solution of the polyimide in TCE was filtered through a 5 micron filter for spin coating onto silicon wafers. The films prepared as in Example 2, had a thickness of 11.3 micrometers, and gave the following mechanical properties when tested as in Example 3: Tensile Strength=219 MPa, Tensile Elongation at Break=5%, and Young's Modulus=5.5 GPa. The linear coefficient of thermal expansion (CTE) was found to be 2.5 ppm from 0°–200° C. when measured by TMA at 5° C./min. TGA (15° C./min, 50°–600° C., in air) revealed the onset of appreciable weight loss to be about 417° C. under these conditions.

EXAMPLE 6

Synthesis, Use and Evaluation of the Polyimide based on 9-Phenyl-9-trifluoromethylxanthene-2,3,6,7-dianhydride (80 mole %), 3,3',4,4'-biphenyl tetracarboxylic dianhydride (BPDA) (20 mole %) and Diaminodurene Similar to the procedure given in Example 1, a polymer was prepared from 5.4808 g (11.7533 mmol) 9-phenyl-9-trifluoromethylxanthene-2,3,6,7-dianhydride, 0.8645 g (2.9383 mmol) BPDA and 2.4131 g (14.6916 mmol) diaminodurene in 35 ml NMP/CHP (4/1 V/V). The BPDA was, however, added as a solid to the stirring solution of the other two monomers with a small amount of solvent used to wash in the BPDA. The reaction was allowed to proceed overnight at room temperature under nitrogen. A viscous poly(amic acid) solution resulted which by GPC (DMAc/LiBr/H-3PO4/THF solvent, polystyrene standards) had an Mn=100000 and an Mw=382000, Mw/Mn=3.81. This solution was diluted with an additional 14.6 ml of NMP/CHP (4/1 V/V), and then was heated to 180°–190° C. to imidize the polymer. During the reaction an additional 14.6 ml of NMP/CHP (4/1 V/V) was added while hot and the reaction was allowed to proceed overnight. The following day, the extremely viscous, homogeneous, yellow reaction mixture was cooled to room temperature which resulted in a homogeneous, immobile gel-like material which was subsequently precipitated into methanol in a blender. After filtration and drying, the polyimide was dissolved in chloroform and again precipitated into methanol. After filtration and drying, the polyimide was dissolved in tetrachloroethane (TCE) (~6% solids W/V) and filtered through a 5 micrometer filter for spin coating onto 5"silicon wafers. The films prepared as in Example 2, had a thickness of 10.6 micrometers, and gave the following mechanical properties when tested as in Example 3: Tensile Strength=190 MPa, Tensile Elongation at Break =13%, and Young's Modulus=3.7 GPa. The linear coefficient of thermal expansion (CTE) was found to be 0.8 ppm from 0°–200° C. when measured by TMA at 5° C./min. TGA (15° C./min, 50°–600° C., in air) revealed the onset of appreciable weight loss to be about 413° C. under these conditions.

EXAMPLE 7

Synthesis, Use and Evaluation of the Polyimide based on 9-Phenyl-9-trifluoromethylxanthene-2,3,6,7-dianhydride (60 mole %), 3,3',4,4'-biphenyl tetracarboxylic dianhydride (40 mole %) and Diaminodurene Similar to the procedure given in Example 1, a polymer was prepared from 4.1106 g (8.8149 mmol) 9-phenyl-9-trifluoromethylxanthene-2,3,6,7-dianhydride, 1.7290 g (5.8766 mmol) BPDA and 2.4131 g (14.6915 mmol) diaminodurene in 33 ml NMP/CHP (4/1 V/V). The BPDA was, however, added as a solid to the stirring solution of the other two monomers with a small amount of solvent used to wash in the BPDA. The reaction was allowed to proceed overnight at room temperature under nitrogen. A viscous poly(amic acid) solution resulted which by GPC (DMAc/LiBr/H-3PO4/THF solvent, polystyrene standards) had an Mn=118000 and an Mw=316000, Mw/Mn=2.67. This solution was diluted with an additional 27.5 ml of NMP/CHP (4/1 V/V), and then was heated to 180°–190° C. to imidize the polymer. The reaction was allowed to proceed overnight. The following day, the extremely viscous, homogeneous, yellow reaction mixture was cooled to room temperature which resulted in a homogeneous, immobile gel-like material which was subsequently precipitated into methanol in a blender. After filtration and drying, the polyimide was dissolved in chloroform and again precipitated into methanol. After filtration and drying, the polyimide was dissolved in tetrachloroethane (TCE) (~5% solids W/V) and filtered through a 5 micrometer filter for spin coating onto 5"silicon wafers. The films prepared as in Example 2, had a thickness of 9.8 micrometers, and gave the following mechanical properties when tested as in Example 3: Tensile Strength=171 MPa, Tensile Elongation at Break=10%, and Young's Modulus=3.4 GPa. The linear coefficient of thermal expansion (CTE) was found to be 0.8 ppm from 0°–200° C. when measured by TMA at 5° C./min. TGA (15° C./min, 50°–600° C., in air) revealed the onset of appreciable weight loss to be about 405° C. under these conditions.

COMPARATIVE EXAMPLES

EXAMPLE I

Synthesis of Polyimide based on 9-Phenyl-9-trifluoromethylxanthene-2,3,6,7-dianhydride and 2,2'-Bis(trifluoromethyl)benzidine (4,4'-diamino-2,2'-bis[trifluoromethyl]biphenyl)

Similar to the procedure given in Example 1, a polymer was prepared from 4.7429 g (10.1709 mmol) 9-phenyl-9-trifluoromethylxanthene-2,3,6,7-dianhydride and 3.2571 g (10.1709 mmol) 2,2'bis(trifluoromethyl)benzidine in 44.8 ml NMP and 11.2 ml CHP. In this case, however, the 9-phenyl-9-trifluoromethylxanthene-2,3,6,7-dianhydride was added as a slurry in 20 ml NMP to the diamine dissolved in about 15 ml of NMP. The remaining NMP along with CHP was used to flush the equipment used to add the 9-phenyl-9-trifluoromethylxanthene-2,3,6,7-dianhydride into the reactor. After dissolution, the reaction was allowed to proceed overnight (ca. 22 hrs) at room temperature under nitrogen. A viscous poly(amic acid) solution resulted and then the reaction was heated to 180°–190° C. and allowed to proceed overnight (ca. 16 hrs) to imidize the polymer.

The following day, the homogeneous, viscous reaction mixture was cooled to room temperature during which the polymer precipitated as a gel-like mass. Heating to about 120° C. redissolved the polymer and the solution was diluted to about 8% solids. Subsequent cooling of the diluted solution again resulted in precipitation of the polymer as a gel-like mass. Removal of the reaction mass from the reactor and addition of tetrachloroethane did not result in dissolution at room temperature. The gel-like mass was subsequently added to methanol in a blender to isolate the polymer as a solid. The polymer appeared to be poorly soluble in tetrachloroethane and NMP at room temperature, but could be dissolved at elevated temperature as noted above.

EXAMPLE II

Synthesis, Use, and Evaluation of Polyimide based on 9-Phenyl-9-trifluoromethylxanthene-2,3,6,7-dianhydride and 4,4'-Oxydianiline (4,4'-diaminodiphenylether)

Similar to the procedure given in Example 1, a polymer was prepared from 5.5967 g (12.002 mmol) 9-phenyl-9-trifluoromethylxanthene-2,3,6,7-dianhydride and 2.4033 g (12.002 mmol) 4,4'-oxydianiline in 48 ml NMP and 12 ml CHP. After dissolution, the reaction was allowed to proceed overnight at room temperature under nitrogen. A viscous poly(amic acid) solution resulted. The reaction was then heated to 180°-190° C. and allowed to proceed overnight to imidize the polymer. The following day, the homogeneous, amber, viscous reaction mixture was diluted to ~10% solids (W/V) with NMP and cooled to room temperature. Filtration of the solution at 1 micrometer proved difficult, so the solution was precipitated into methanol, redissolved in chloroform, filtered through a coarse frit, and reprecipitated into methanol. GPC (DMAc/LiBr/H3PO4/THF solvent, polystyrene standards) of the polyimide showed an Mn=138000 and an Mw=327000, Mw/Mn=2.36. Subsequently, the dried polymer was dissolved in tetrachloroethane (~8% solids, W/V) and filtered through a 5 micrometer filter for spin coating onto 5" silicon wafers. The films were prepared as in Example 2. The 10.6 micrometer thick, pale yellow films gave the following mechanical properties when tested as in Example 3: Tensile Strength=186 MPa, Tensile Elongation at Break=34%, and Young's Modulus=2.4 GPa. The linear coefficient of thermal expansion (CTE) was found to be 51 ppm from 0°-200° C. when measured by TMA at 10° C./min. TGA (15° C./min, 50°-600° C., in air) revealed the onset of appreciable weight loss to be about 430° C. under these conditions. The dielectric constant of the dried film at 0% R.H. and 1 MHz was found to be 2.8.

EXAMPLE III

Synthesis, Use, and Evaluation of Polyimide based on 9-Phenyl-9-trifluoromethylxanthene-2,3,6,7-dianhydride and 3,4'-Oxydianiline (3,4'-diaminodiphenylether)

Similar to the procedure given in Example 1, a polymer was prepared from 5.5967 g (12.002 mmol) 9-phenyl-9-trifluoromethylxanthene-2,3,6,7-dianhydride and 2.4033 g (12.002 mmol) 3,4'-oxydianiline in 36 ml NMP and 9 ml CHP. After dissolution, the reaction was allowed to proceed overnight at room temperature under nitrogen. A viscous poly(amic acid) solution resulted. The reaction was then heated to 180°-190° C. and allowed to proceed overnight to imidize the polymer. The following day, the homogeneous, amber, viscous reaction mixture was cooled to room temperature, diluted with NMP and precipitated into methanol. Subsequently, the polymer was dissolved in chloroform and reprecipitated into methanol. GPC (DMAC@135° C., polystyrene standards) of the polyimide showed an Mn=76100 and an Mw=167000, Mw/Mn=2.19. After filtration and drying, the polymer was dissolved in tetrachloroethane (18% solids, W/V) and filtered through a 5 micrometer filter for spin coating onto 5" silicon wafers. The films were prepared as in Example 2. The 11.4 micrometer thick, pale yellow films gave the following mechanical properties when tested as in Example 3: Tensile Strength=192 MPa, Tensile Elongation at Break=105%, and Young's Modulus=2.6 GPa. The linear coefficient of thermal expansion (CTE) was found to be 37 ppm from 0°-200° C. when measured by TMA at 10° C./min. TGA (15° C./min, 50°-600° C., in air) revealed the onset of appreciable weight loss to be about 419° C. under these conditions. The dielectric constant of the dried film at 0% R.H. and 1 MHz was found to be 2.8.

EXAMPLE IV

Synthesis, Use, and Evaluation of Polyimide based on 9-Phenyl-9-trifluoromethylxanthene-2,3,6,7-dianhydride and m-Phenylene diamine Similar to the procedure given in Example 1, a polymer was prepared from 6.4940 g (13.9261 mmol) 9-phenyl-9-trifluoromethylxanthene-2,3,6,7-dianhydride and 1.5060 g (13.9261 mmol) m-phenylene in 44.8 ml NMP and 11.2 ml CHP. After dissolution, the reaction was allowed to proceed overnight at room temperature under nitrogen. A viscous poly(amic acid) solution resulted. The reaction was then heated to 180°-190° C. and allowed to proceed overnight to imidize the polymer. The following day, the homogeneous, dark amber, viscous reaction mixture was cooled to room temperature and filtered through a 5 micrometer filter for spin coating onto 5" silicon wafers. GPC (DMAc/LiBr/H3PO4/THF solvent, polystyrene standards) of the polyimide showed an Mn=67500 and an Mw=204000, Mw/Mn=3.03. The films were prepared as in Example 2. The 12.0 micrometer thick, low color films gave the following mechanical properties when tested as in Example 3: Tensile Strength=173 MPa, Tensile Elongation at Break =48%, and Young's Modulus=2.7 GPa. The linear coefficient of thermal expansion (CTE) was found to be 28 ppm from 0°-200° C. when measured by TMA at 10° C./min. TGA (15° C./min, 50°-600° C., in air) revealed the onset of appreciable weight loss to be about 411° C. under these conditions. The dielectric constant of the dried film at 0% R.H. and 1 MHz was found to be 2.8.

EXAMPLE V

Synthesis, Use, and Evaluation of Polyimide based on 9-Phenyl-9-trifluoromethylxanthene-2,3,6,7-dianhydride and 2,2-Bis(4-aminophenyl)hexafluoropropane Similar to the procedure given in Example 1, a polymer was prepared from 4.6598 g (9.9928 mmol) 9-phenyl-9-trifluoromethylxanthene-2,3,6,7-dianhydride and 3.3402 g (9.9928 mmol) 2,2-bis(4aminophenyl)hexafluoropropane in 33.6 ml NMP and 8.4 ml CHP. After dissolution, the reaction was allowed to proceed overnight at room temperature under nitrogen. A viscous poly(amic acid) solution resulted. The reaction was then heated to 180°-190° C. and allowed to proceed overnight to imidize the polymer. The following day, the apparently homogeneous, viscous reaction mixture was cooled to room temperature and diluted with 20 ml NMP. GPC (DMAc/LiBr/H3PO4/THF solvent, polystyrene standards) of the polyimide showed an Mn=126000 and an Mw=321000, Mw/Mn=2.55. Filtration of the solution at 1 micrometer proved difficult and a gel-like material was found on the surface of the filter, so the solution was precipitated into methanol, redissolved in chloroform, filtered through a coarse frit, and reprecipitated into methanol. Subsequently, the dried polymer was dissolved in tetrachloroethane (~15% solids, W/V) and filtered through a 5 micrometer filter for spin coating onto 5" silicon wafers. The films were prepared as in Example 2. The 8.5 micrometer thick, nearly colorless films gave the following mechanical properties when tested as in Example 3: Tensile Strength=136 MPa, Tensile Elongation at Break=39%, and Young's Modulus=2.3 GPa. The linear coefficient of thermal expansion (CTE) was found to be 39 ppm from 0°-200° C. when measured by TMA at 10° C./min. TGA (15° C./min, 50°-600° C., in air) revealed the onset of appreciable weight loss to be about 435° C. under these conditions. The dielectric constant of the dried film at 0% R.H. and 1 MHz was found to be 2.5.

EXAMPLE VI

Synthesis of the Polyimide based on 9-Phenyl-9-trifluoromethylxanthene-2,3,6,7-dianhydride and 2,5-Dimethyl-p-phenylene diamine Into a 100 ml reaction kettle fitted with a nitrogen inlet/outlet, mechanical stirrer, and a Dean-Stark trap with condenser were charged 6.1916 g (13.2775 mmol) of 9-phenyl-9-trifluoromethylxanthene-2,3,6,7-dianhydride and 1.8084 g (13.2775 mmol) of 2,5-dimethyl-p-phenylene diamine. Shortly thereafter, 33.75 ml of NMP and 11.25 ml of CHP (3/1, 15% solids) were added and stirring was begun. The temperature was maintained at room temperature overnight under nitrogen. GPC (DMAc/LiBr/H3PO4/THF solvent, polystyrene standards) of the poly(amic acid) solution revealed an Mn=71400 and an Mw=150000, Mw/Mn=2.11. The following day, the orange reaction mixture was diluted with 10.25 ml of NMP and 3.45 ml of CHP (3/1, 12% solids), raised to a temperature of 180°-190° C. and maintained overnight to imidize the polymer. A waxy, off-white to yellow solid resulted at high temperature, which remained so when cooled to room temperature. The polymer was isolated from the reaction solution by pouring the heterogeneous mixture into methanol followed by drying under vacuum with a nitrogen bleed. The isolated polymer was found to be largely insoluble in standard solvents. A similar reaction was also performed initially at 20% solids and then diluted to 8% solids prior to imidization. A similar waxy, off-white to yellow solid resulted upon imidization as before.

EXAMPLE VII

Synthesis of Polyimide based on 9-Phenyl-9-trifuoromethylxanthene-2,3,6,7-dianhydride and p-phenylene diamine In a similar manner to Example 1, 6.4940 g (13.9261 mmol) of 9-phenyl-9-trifluoromethylxanthene-2,3,6,7-dianhydride and 1.5060 g (13.9261 mmol) of p-phenylene diamine were dissolved in 57.6 ml of NMP and 14.4 ml CHP. A viscous poly(amic acid) solution resulted after stirring overnight at RT. Upon heating to imidize (180°-190° C.), the reaction mixture quickly became heterogeneous with the formation of an off-white solid which separated from solution. Isolation was performed by pouring the reaction mixture into methanol followed by filtration and drying. The isolated polymer was found to be largely insoluble in standard solvents.

EXAMPLE VIII

Synthesis, Use, and Evaluation of Polyimide based on 9,9-Bis(trifluoromethyl)xanthene-2,3,6,7-dianhydride and 2,2-Bis(4-aminophenyl)hexafluoropropane Similar to the procedure given in Example 1, a polymer was prepared from 5.7822 g (12.6185 mmol) 9,9-bis(trifluoromethyl)xanthene-2,3,6,7-dianhydride and 4.2178 g (12.6185 mmol) 2,2-bis(4aminophenyl)hexafluoropropane in 24 ml NMP and 6 ml CHP (4/1 V/V). The 9,9-Bis(trifluoromethyl)xanthene-2,3,6,7-dianhydride dissolved slowly into the reaction mixture and the reaction was allowed to proceed several days at room temperature under nitrogen. A viscous homogeneous poly(amic acid) solution resulted. The reaction was then heated to 180°-190° C. and allowed to proceed overnight to imidize the polymer. The following day, the homogeneous, viscous reaction mixture was cooled to room temperature, diluted with 16 ml NMP Filtration of the solution at 1 micrometer proved difficult, so the solution was precipitated into methanol, dissolved in chloroform, filtered through a coarse frit, and reprecipitated into methanol. GPC (DMAC@135° C., polystyrene standards) of the polyimide showed an Mn=50700 and an Mw=102000, Mw/Mn=2.01 and GPC (DMAc/LiBr/H3PO4/THF solvent, polystyrene standards) gave an Mn=54500 and an Mw=151000, Mw/Mn =2.78. H-NMR of the polyimide in CDC13 confirmed the expected structure with resonances due to 9,9-bis(trifluoromethyl)xanthene-2,3,6,7-dianhydride residues at ~7.9 and 8.6 ppm (singlets) and resonances due to 2,2-bis(4-aminophenyl)hexafluoropropane residues centered at ~7.6 ppm (pair of doublets). Subsequently, the dried polymer was dissolved in tetrachloroethane (~15.3% solids, W/V) and filtered through a 10 micrometer filter for spin coating onto 5" silicon wafers. The films were prepared as in Example 2. The 10.3 micrometer thick, pale yellow films gave the following mechanical properties when tested as in Example 3: Tensile Strength=127 MPa, Tensile Elongation at Break=36%, and Young's Modulus=2.4 GPa. The linear coefficient of thermal expansion (CTE) was found to be 40 ppm from 0°-200° C. when measured by TMA at 10° C./min. TGA (15° C./min, 50°-600° C., in air) revealed the onset of appreciable weight loss to be about 427° C. under these conditions. The dielectric constant of the dried film at 0% R.H. and 1 MHz was found to be 2.3.

EXAMPLE IX

Synthesis, Use, and Evaluation of Polyimide based on 9,9-Bis(trifluoromethyl)xanthene-2,3,6,7-dianhydride and 5-Trifluoromethyl-1,3-phenylene diamine Similar to the procedure given in Example 1, a polymer was prepared from 7.2234 g (15.7637 mmol) 9,9-bis(trifluoromethyl)xanthene-2,3,6,7-dianhydride and 2.7766 g (15.7637 mmol) 5-trifluoromethyl-1,3-phenylene diamine in 36 ml NMP and 9 ml CHP. The 9,9-bis(- trifluoromethyl)xanthene-2,3,6,7-dianhydride dissolved slowly into the reaction mixture and the reaction was allowed to proceed overnight at room temperature under nitrogen. A homogeneous poly(amic acid) solution resulted which by GPC (DMAc/LiBr/H-3PO4/THF solvent, polystyrene standards) had an Mn=55900 and an Mw=114000, Mw/Mn=2.05. The reaction was then heated to 180°-190° C. and allowed to proceed overnight to imidize the polymer. The following day, the homogeneous, viscous reaction mixture was cooled and precipitated into methanol. GPC (DMAC@135° C., polystyrene standards) of the polyimide prior to precipitation showed an Mn=39300 and an Mw=84800, Mw/Mn=2.16. Subsequently, the polymer was dissolved in chloroform and reprecipitated into methanol. After filtration and drying, the polymer was dissolved in DMAC (20% solids, W/V) and filtered through a 5 micrometer filter for spin coating onto 5" silicon wafers. The films were prepared as in Example 2 except that it was found desirable to warm the solution to about 50° C. for several hours prior to coating to insure homogeneous coating performance. Coating was performed at room temperature. The 9.3 micrometer, pale yellow films gave the following mechanical properties when tested as in Example 3: Tensile Strength=135 MPa. Tensile Elongation at Break=34%, and Young's Modulus=2.1 GPa. The linear coefficient of thermal expansion (CTE) was found to be 36 ppm from 0°-200° C. when measured by TMA at 10° C./min. TGA (15° C./min, 50°-600° C., in air) revealed the onset of appreciable weight loss to be about 431° C. under these conditions. The dielectric constant of the dried film at 0% R.H. and 1 MHz was found to be 2.6.

EXAMPLE X

Synthesis of Polyimide based on 3,3',4,4'-biphenyl tetracarboxylic dianhydride and Diaminodurene Similar to the procedure given in Example 1, a polymer was prepared from 5.1339 g (17.449 mmol) BPDA and 2.8660 g (17.449 mmol) diaminodurene in 32 ml NMP. The BPDA was, however, added as a solid to the stirring solution of the diamine with a small amount of solvent used to wash in the BPDA. The reaction was allowed to proceed overnight at room temperature under nitrogen. A viscous poly(amic acid) solution resulted which by GPC (DMAc/LiBr/H3PO4/THF solvent, polystyrene standards) had an Mn=30700 and an Mw=52700, Mw/Mn=1.72. This solution was diluted with 8.0 ml CHP (4/1 V/V, NMP/CHP), and then was heated to 180°-190° C. to imidize the polymer. After about 2 hrs, the solution became heterogeneous and the polymer precipitated from solution. After several addition hours, the polymer was precipitated into methanol. After filtration and drying, it was attempted to dissolve the polymer in several of the polyimide solvents, but the polymer proved to be largely insoluble.

What is claimed is:

1. A polyimide comprising the structure:

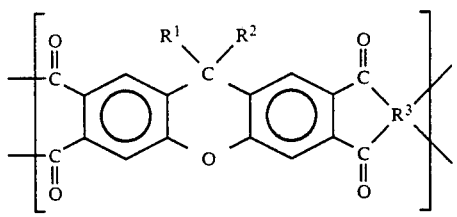

wherein
R1 is aryl
R2 is -CnF2n+1,
N is an integer 1-3
R3 is selected from the group consisting of

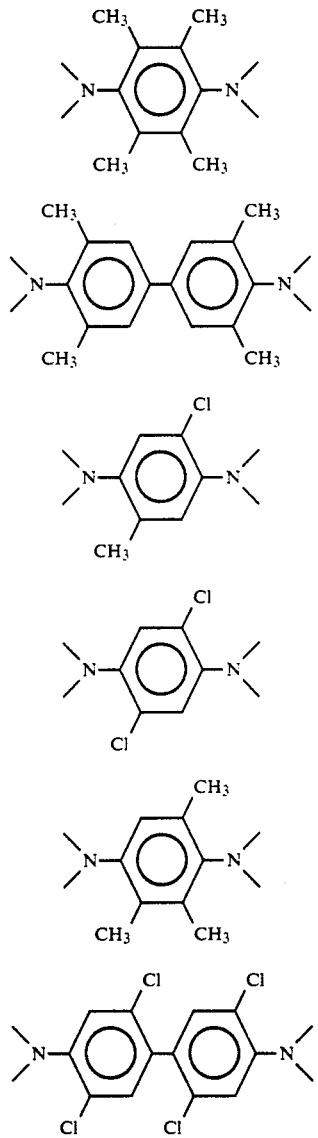

with the requirement that the polyimide
is soluble at a level of at least 1% by weight in at least one organic solvent selected from the group consisting of dimethylsulfoxide, diethylsulfoxide, N,N-dimethylformamide, N,N-diethylformamide, N,N-dimethylacetamide, N,N-diethylacetamide, N-methyl-2-pyrrolidone, N-cyclohexyl-2-pyrrolidone, 1,3-dimethyl-2-imidozolidione, N-vinyl-2-pyrrolidone, phenol, o-, m-, p-cresol, xylenol, halogenated phenol, catechol, hexamethylphosphoramide, γ-butyrolactone, chloroform, tetrachloroethane, halogenated hydrocarbon, mixtures thereof, and has a coefficient of thermal expansion of less than 25 ppm.

2. A polyimide as defined in claim 1, wherein R3 is selected from the group consisting of:

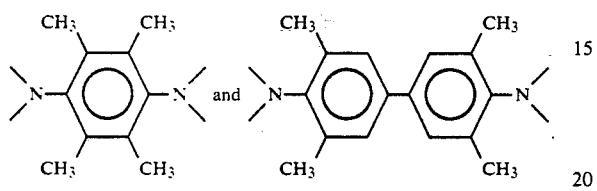

3. A polyimide as defined in claim 2, wherein R1 is phenyl.
4. A polyimide as defined in claim 3, wherein R2 is -CF3.
5. A film comprising a polyimide, which polyimide comprises the structure:

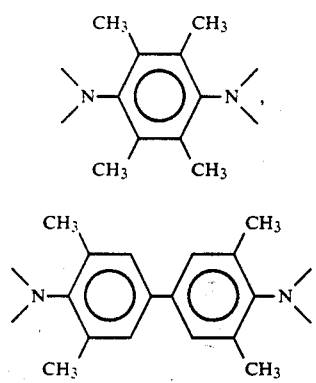

wherein
R1 is aryl
R2 is -CnF2n+1.
N is an integer 1-3
R3 is selected from the group consisting of:

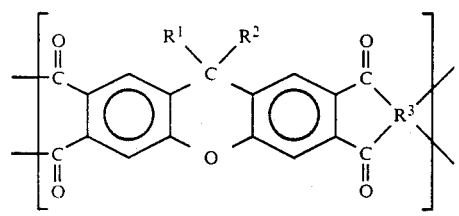

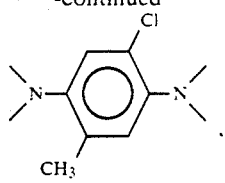

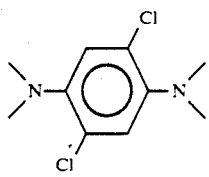

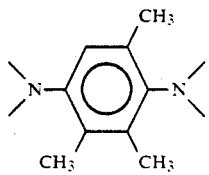

and

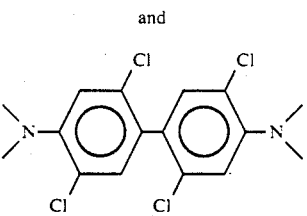

with the requirement that the polyimide
is soluble at a level of at least 1% by weight in at least one organic solvent selected from the group consisting of dimethylsulfoxide, diethylsulfoxide, N,N-dimethylformamide, N,N-diethylformamide, N,N-dimethylacetamide, N,N-diethylacetamide, N-methyl-2-pyrrolidone, N-cyclohexyl-2-pyrrolidone, 1,3-dimethyl-2-imidozolidione, N-vinyl-2-pyrrolidone, phenol, o-, m-, p-cresol, xylenol, halogenated phenol, catechol, hexamethylphosphoramide, γ-butyrolactone, chloroform, tetrachloroethane, halogenated hydrocarbon, mixtures thereof, and has a coefficient of thermal expansion of less than 25 ppm.

6. A film as defined in claim 5, wherein R3 is selected from the group consisting of

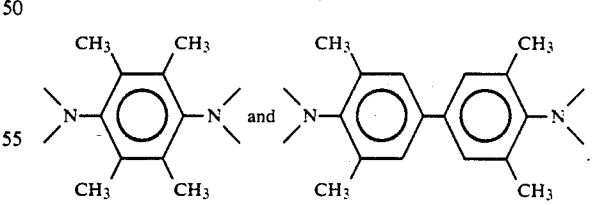

7. A film as defined in claim 6, wherein R1 is phenyl.
8. A film as defined in claim 7, wherein R2 is -CF3.

* * * * *